US012349750B2

United States Patent
Ayanwale et al.

(10) Patent No.: US 12,349,750 B2
(45) Date of Patent: Jul. 8, 2025

(54) SYSTEM FOR PROVIDING A VIRTUAL TAILORING TOOL

(71) Applicant: Ovaflow, Inc., Katy, TX (US)

(72) Inventors: Oluwasegun Ayanwale, Katy, TX (US); Elizabeth Ayanwale, Katy, TX (US)

(73) Assignee: Ovaflow, Inc., Katy, TX (US)

( * ) Notice: Subject to any disclaimer, the term of this patent is extended or adjusted under 35 U.S.C. 154(b) by 555 days.

(21) Appl. No.: 17/740,179

(22) Filed: May 9, 2022

(65) Prior Publication Data

US 2023/0354940 A1 Nov. 9, 2023

(51) Int. Cl.
*A41H 1/02* (2006.01)
*G06F 3/04815* (2022.01)
*G06F 3/04845* (2022.01)
*G06Q 30/0601* (2023.01)
*G06T 15/20* (2011.01)
*G06T 17/00* (2006.01)

(52) U.S. Cl.
CPC ............ *A41H 1/02* (2013.01); *G06F 3/04815* (2013.01); *G06F 3/04845* (2013.01); *G06Q 30/0643* (2013.01); *G06T 15/205* (2013.01); *G06T 17/00* (2013.01); *G06T 2200/24* (2013.01); *G06T 2215/16* (2013.01)

(58) Field of Classification Search
CPC ........................................................ A41H 1/02
USPC ....................................................... 33/15, 17 R
See application file for complete search history.

(56) References Cited

U.S. PATENT DOCUMENTS

| 6,415,199 | B1* | 7/2002 | Liebermann | A41H 3/007 33/512 |
| 7,146,239 | B2* | 12/2006 | Loeb | G06Q 30/00 700/133 |
| 10,388,050 | B2* | 8/2019 | Ogata | G06F 30/00 |
| 10,953,334 | B2* | 3/2021 | Kolen | A63F 13/63 |
| 11,869,064 | B1* | 1/2024 | Soekawan | G06T 17/00 |
| 12,070,093 | B1* | 8/2024 | Hadap | G06F 30/10 |
| 12,165,269 | B2* | 12/2024 | Brodsky | G06T 19/20 |
| 2007/0106565 | A1* | 5/2007 | Coelho | G06Q 30/02 705/26.61 |
| 2009/0234489 | A1* | 9/2009 | Healy | G06Q 30/02 700/130 |
| 2017/0330291 | A1* | 11/2017 | Cotto | G06Q 50/01 |
| 2020/0402136 | A1* | 12/2020 | Sullivan | G06Q 30/06 |
| 2021/0192606 | A1* | 6/2021 | Weiner | G06Q 30/0643 |
| 2022/0391958 | A1* | 12/2022 | Yeom | G06Q 30/0282 |

* cited by examiner

*Primary Examiner* — George B Bennett
(74) *Attorney, Agent, or Firm* — The Rapacke Law Group, P.A.; Andrew Rapacke

(57) ABSTRACT

A system for providing a virtual tailoring tool is disclosed, the system including at least one client device and at least one tailor device in operable connection with a user network. An application server is in operable communication with the network to host an application system for providing a virtual tailoring tool. The application system includes a user interface for providing access to the application system to the at least one client device and at least one tailor device. The user interface is in operable communication with a measurement module to permit real-time measurements of a 3-dimensional model generated from imagery of a client.

18 Claims, 6 Drawing Sheets

SYSTEM FOR PROVIDING A VIRTUAL TAILORING TOOL

CROSS-REFERENCE TO RELATED APPLICATIONS

The present application claims priority to U.S. Provisional Patent Application No. 63/158,613 filed Mar. 9, 2021, entitled "SYSTEM FOR PROVIDING A VIRTUAL TAILORING TOOL" which is hereby incorporated by reference in its entirety.

TECHNICAL FIELD

The embodiments generally relate to computerized systems for 3-dimensional object measurements and more specifically relate to computerized systems for providing a virtual tailoring tool.

BACKGROUND

In recent years, there has been a rise in the use of computing devices in the area of fashion. It has become increasingly common for individuals to utilize computing devices to design, market, make, and sell fashion items such as articles of clothing and apparel accessories. Conventional shopping at a brick-and-mortar store allows the shopper to try on various garments to ensure the garment fits as desired based on the users intended appearance. A shortcoming of online shopping is the inability to try on a garment before it is purchased, and retailers miss the opportunity to provide personalized recommendations based on the buyer's body-type.

While garments are labelled with a size, often times sizes are not standardized across various brands. This results in uncertainty when shopping online for a garment. Tailors may be able to adjust the size of the components of the garment but traditionally require the buyer to be present for measurements and fitting of each garment they would like tailored.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments provided herein relate to a system for providing a virtual tailoring tool, the system including at least one client device and at least one tailor device in operable connection with a user network. An application server is in operable communication with the network to host an application system for providing the virtual tailoring tool. The application system includes a user interface for providing access to the application system to the at least one client device and at least one tailor device. The user interface is in operable communication with a measurement module to permit real-time measurements of a 3-dimensional model generated from imagery of a client.

The system may be utilized by tailors to remotely measure a client. Further the system allows the client to virtually model garments to determine if the garment fits appropriately. The tailor may then make alteration to the garment based on the client's measurements.

The system allows tailors to remotely generate real-time body measurements of their clients to permit the tailor to create a custom-made garment for their client. The client can utilize the tool downloaded to their computing device capture imagery of their body using a camera in communication with their computing device (e.g., a smartphone camera). The imagery of the client is converted into a 3-dimensional model having real-time body measurements. The 3-dimensional model is then transmitted to the tailor who can manually obtain real-time body measurements using the measurement tool. For example, the tailor may drag across a region of the 3-dimensional model to generate the measurements.

In one aspect, the measurement module permits a tailor to drag a finger over a region of the 3-dimensional model to provide a real-time measurement.

In one aspect, an online marketplace is in operable communication with the system to permit the client to shop for garments.

In one aspect, a client database is provided to store a plurality of client measurements.

In one aspect, a garment module depicts a virtual representation of the garment.

In one aspect, a measurement categories interface permits the user to select one or more garment types.

In one aspect, a body measurements interface comprises a plurality of measurements associated with the client.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
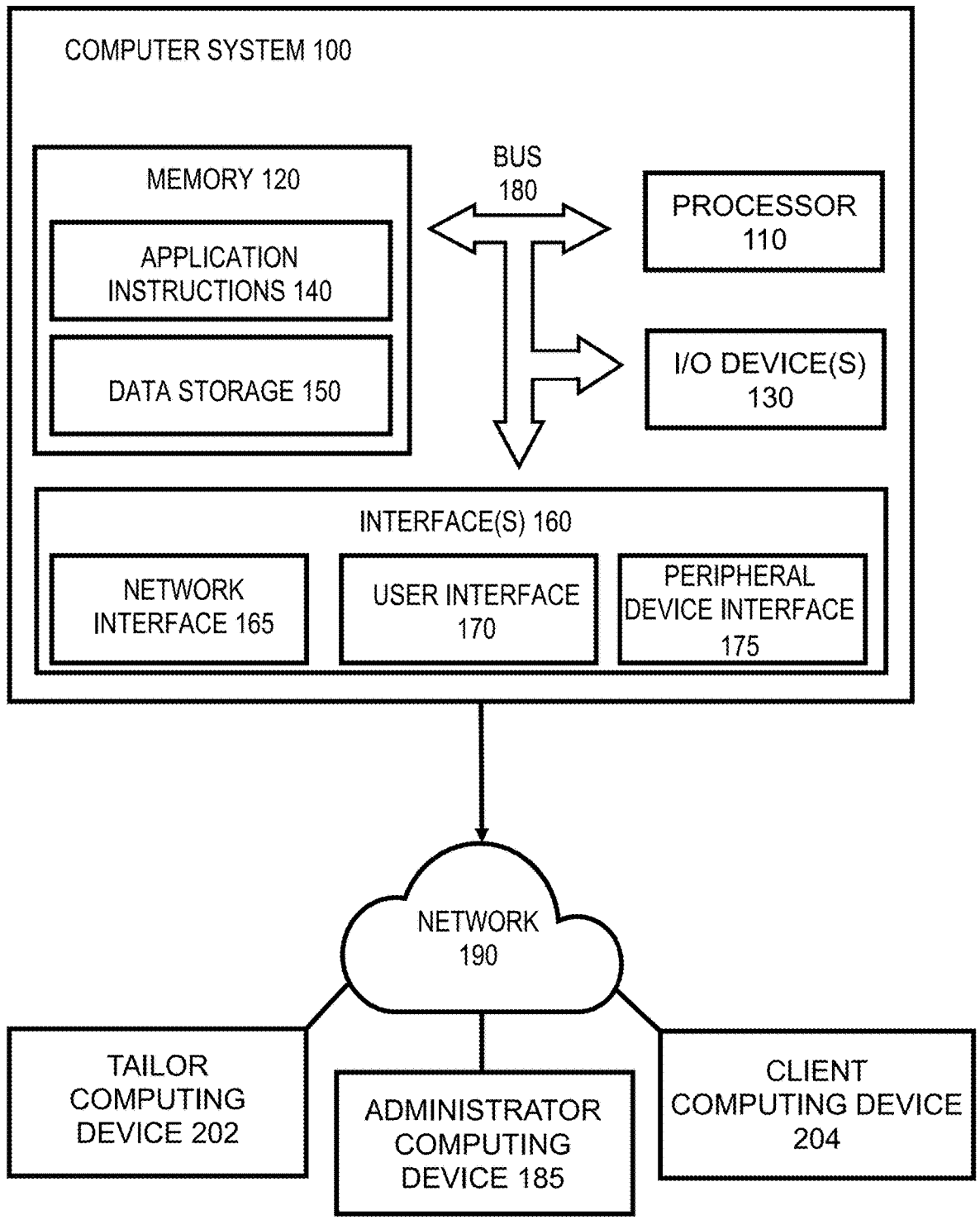
FIG. 1 illustrates a block diagram of a computing system, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, and/or computer program product at any possible technical detail level of integration. A computer program product can include, among other things, a computer-readable storage medium having computer-readable program instructions thereon for causing a processor to carry out aspects of the present disclosure.

The embodiments allow tailors to remotely generate real-time body measurements of their clients to permit the tailor to create a custom-made garment for their client. The client can utilize the tool downloaded to their computing device capture imagery of their body using a camera in communication with their computing device. The imagery of the client is converted into a 3-dimensional model having real-time body measurements. The 3-dimensional model is then transmitted to the tailor who can manually obtain the measurements from the 3-dimensional model by dragging a finger across the 3-dimensional model of the client.

The system may be utilized by tailors to remotely measure a client. Further the system allows the client to virtually model garments to determine if the garment fits appropriately. The tailor may then make alteration to the garment based on the client's measurements.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multi-threading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a tailor computing device 202, an administrator computing device 185 and a client computing device 204 each in communication via the network 190. The tailor computing device 202 may be utilized by a tailor to perform the various functionalities described herein. The administrator computing device 185 is utilized by an administrative user to moderate content and to perform other administrative functions. The client computing device 204 may be utilized by the client to perform the various functionalities described herein.

Figure 2:
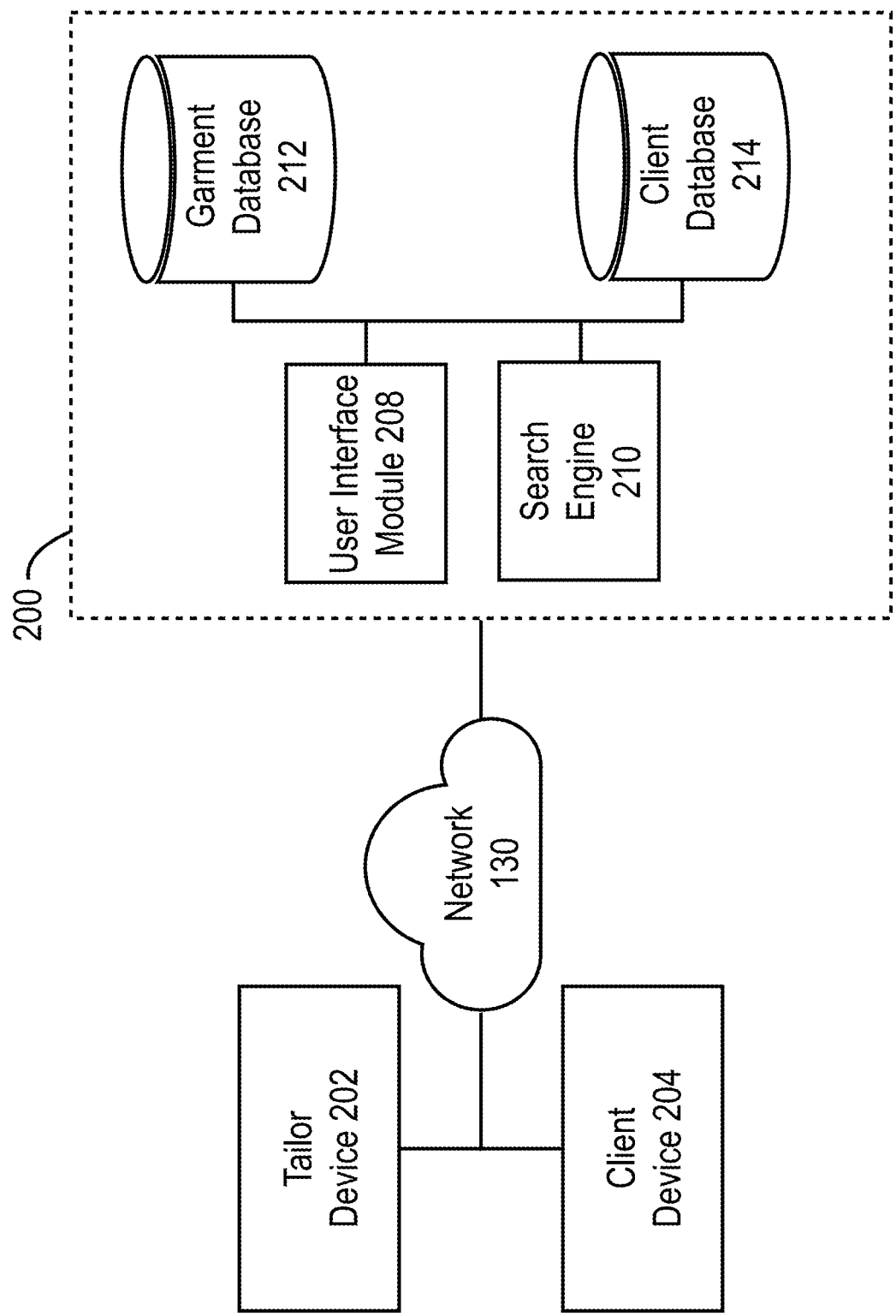
FIG. 2 illustrates a block diagram of the application system, according to some embodiments.

FIG. 2 illustrates a block diagram of the application system 200 in operable communication with a tailor device 202 and a client device 204 via a network 130. The tailor device 202 is utilized by the tailor to obtain real-time body measurements of the client from the 3-dimensional model of the client that was transmitted via the client device. The client device 204 may be utilized to capture imagery of the client via a camera in operable communication with the client device 204. The client device 204 may then transmit the imagery, client preferences, and similar communications to the tailor device 202. The application system 200 may include a user interface module 208, search engine 210, garment database 212, and client database 214. The user interface module 208 is operable to display the 3-dimensional model, imagery, and information stored in the garment database 212 and client database 214. The search engine 210 permits the user to search information stored in the garment database 212 and client database 214 such as to search client profiles, client measurements, garments, and other information associated with the system.

In some embodiments, the client database 214 stores client information such as client preferences, measurements, 3-dimensional models associated with the client, client garments purchased or previously modified by the tailor, etc.

In some embodiments, the garment database 212 stores garments which can be purchased, altered, virtually modeled, or otherwise interacted with via the system.

Figure 3:
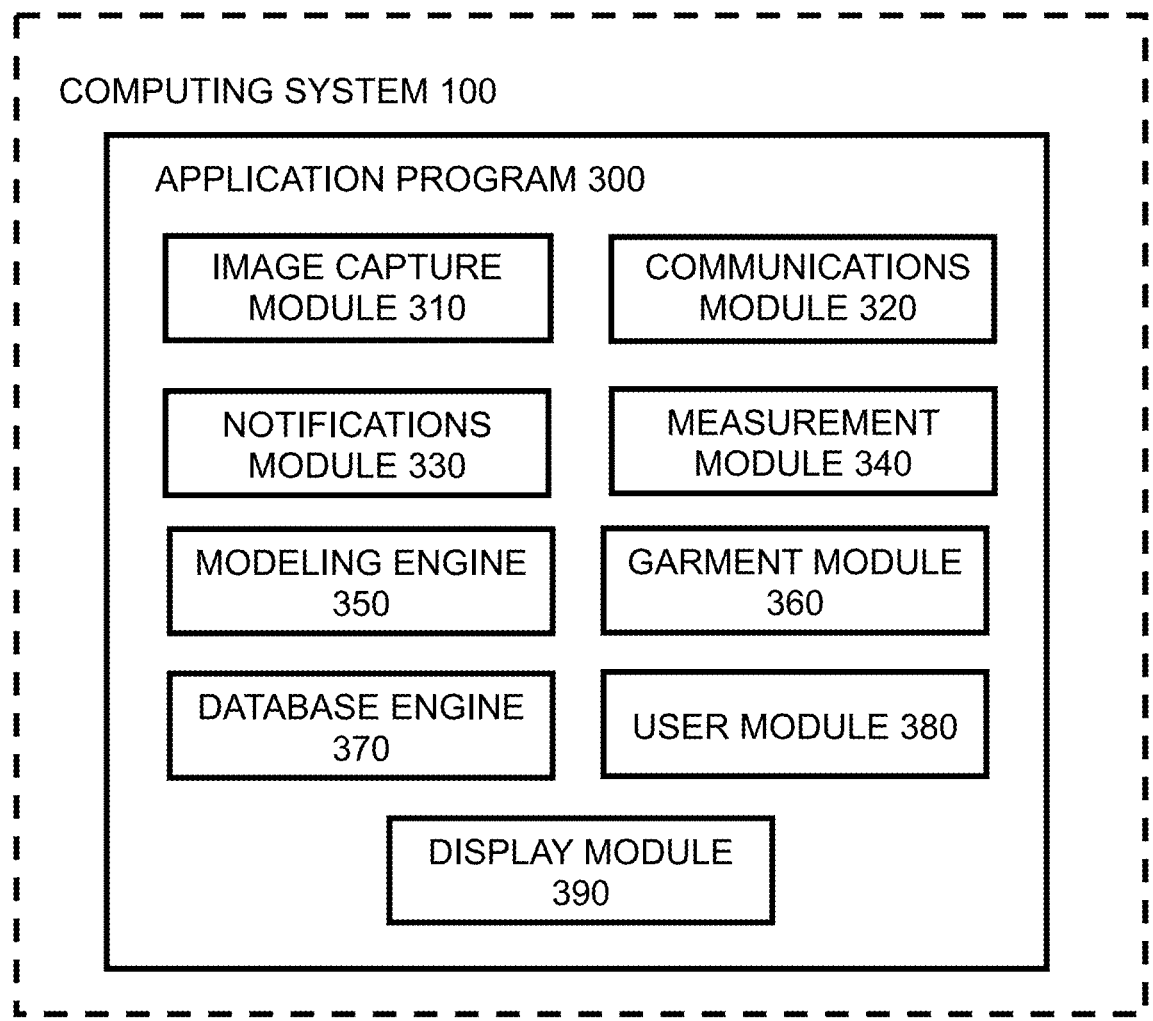
FIG. 3 illustrates a block diagram of a computing system and an application program, according to some embodiments.

FIG. 3 illustrates an example computer architecture for the application program 300 operated via the computing system 100. The computer system 100 comprises several modules and engines configured to execute the functionalities of the application program 300, and a database engine 370 configured to facilitate how data is stored and managed in one or more databases. In particular, FIG. 3 is a block diagram showing the modules and engines needed to perform specific tasks within the application program 300.

FIG. 3 illustrates a block diagram of the server engine m communication with the computing system and application program 300 along with associated modules. An image capturing module 310 is in operable communication with the camera of the clients computing device to permit the capture of imagery of the client and generate an image file. A communications module 320 facilitates the communication of information between the client device and the tailor device. A notifications module 330 may generate and provide notifications to the client device and/or tailor device to notify the user of communications between users, information transmitted by the tailor, recommendations for products, etc. A measurement module 340 permits the tailor to obtain real-time measurements from the 3-dimensional model of the client. For example, the tailor may drag their finger over a region of the client's body depicted in the 3-dimensional model to measure the region. This may be performed for multiple regions of the 3-dimensional model to simulate the tailor measuring the body of the client. A modeling engine 350 creates an overlay of the garment of the 3-dimensional model of the client to allow the client to view a realistic virtual representation of the garment on their body. A garment module 360 provides a depiction of the garment which the client selects to have tailored.

In some embodiments, the communication module 320 is configured for receiving, processing, and transmitting a user command and/or one or more data streams. In such embodiments, the communication module 320 performs communication functions between various devices, including the tailor computing device 202, the administrator computing device 185, and a client computing device 204. In some embodiments, the communication module 320 is configured to allow one or more users of the system, including a third-party, to communicate with one another. In some embodiments, the communications module 320 is configured to maintain one or more communication sessions with one or more servers, the administrative computing device 185, and/or one or more client computing device(s) 204.

In some embodiments, a database engine 370 is configured to facilitate the storage, management, and retrieval of data to and from one or more storage mediums, such as the one or more internal databases described herein. In some embodiments, the database engine 370 IS coupled to an external storage system. In some embodiments, the database engine 370 IS configured to apply changes to one or more databases. In some embodiments, the database engine 370 comprises a search engine component for searching through thousands of data sources stored in different locations.

In some embodiments, the user module 380 facilitates the creation of a user account (i.e., the creation of an account for tailors and/or clients) for the application system. The user module 380 may allow the user to create a user profile which includes user information, user preferences, establish user credentials, garment fitting information, garment preferences and the like.

In some embodiments, the display module 390 is configured to display one or more graphic user interfaces, including, e.g., one or more user interfaces, one or more consumer interfaces, one or more video presenter interfaces, etc. In some embodiments, the display module 390 is configured to temporarily generate and display various pieces of information in response to one or more commands or operations. The various pieces of information or data generated and displayed may be transiently generated and displayed, and the displayed content in the display module 390 may be refreshed and replaced with different content upon the receipt of different commands or operations in some embodiments. In such embodiments, the various pieces of information generated and displayed in a display module 390 may not be persistently stored.

Figure 4:
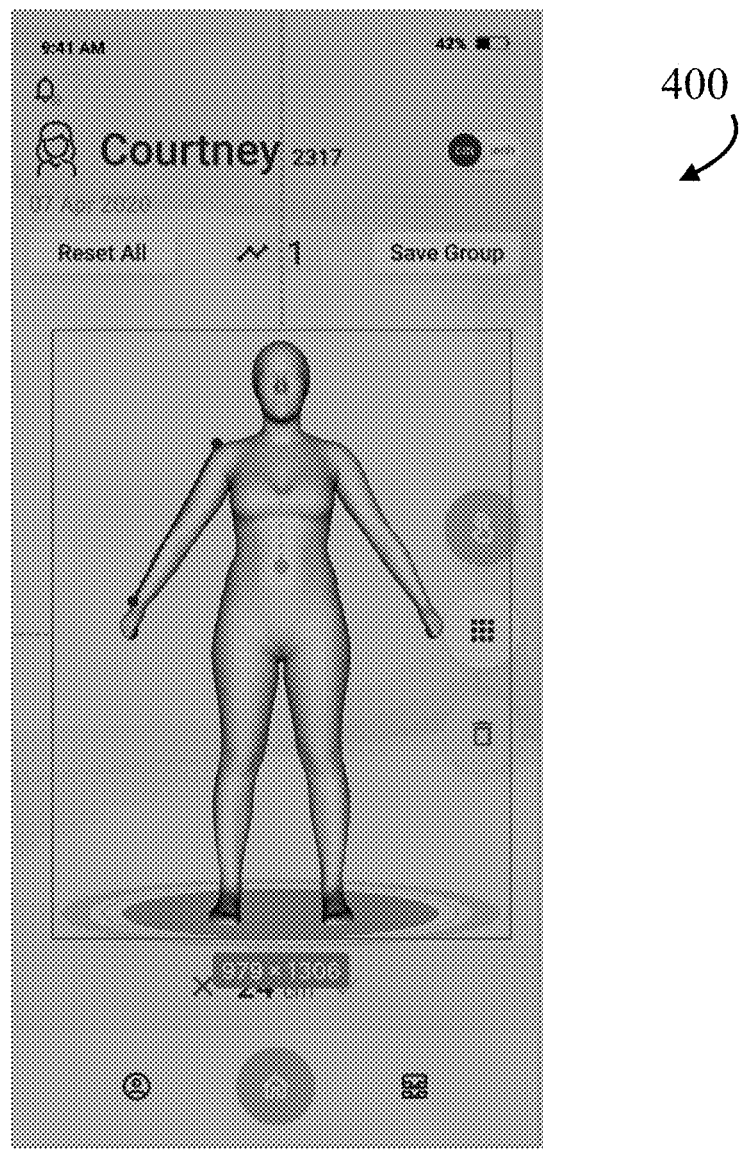
FIG. 4 illustrates a screenshot of the 3-dimensional model interface, according to some embodiments.

FIG. 4 illustrates a screenshot of the 3-dimensional model interface 400 provided on the computing device (e.g., the tailor computing device). The 3-dimensional model is associated with a client and allows the tailor to measure the dimensions of the client's body using a measurement tool. The measurement tool allows the tailor to indicate a region of the client's body to measure by dragging a finger. While dragging their finger, the tailor is displayed a measurement in real-time corresponding to the length of the region over which their finger was dragged.

Figure 5:
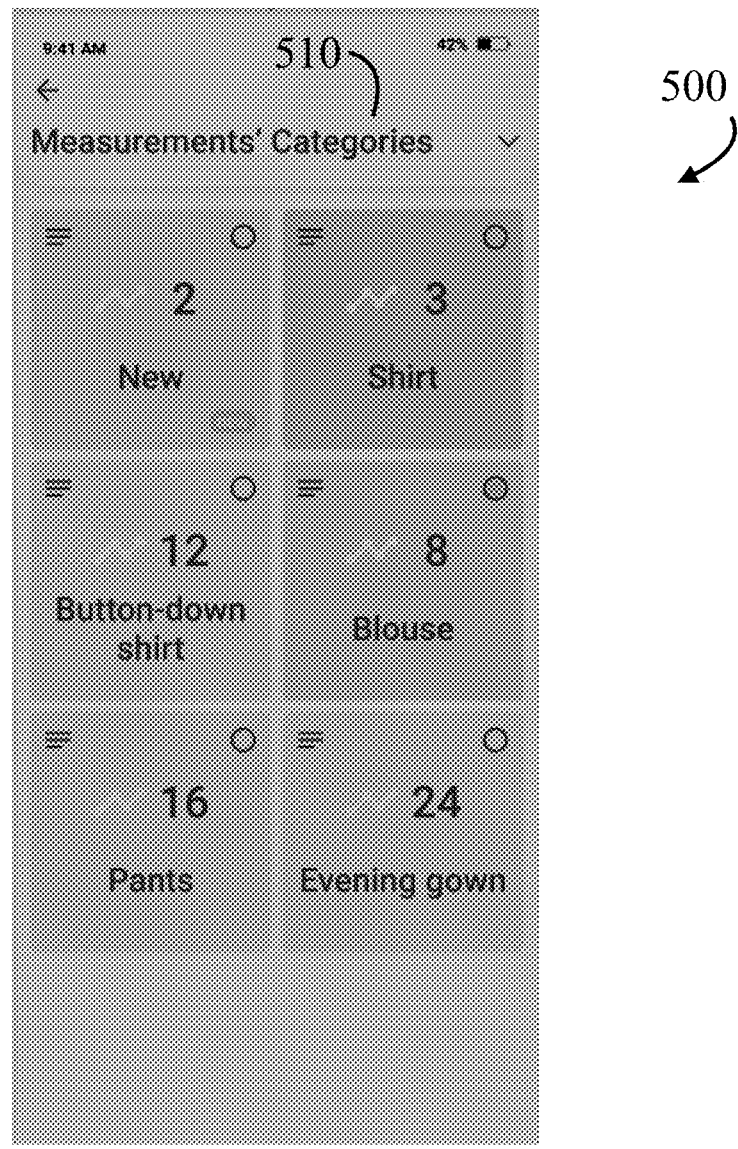
FIG. 5 illustrates a screenshot of the measurement categories interface, according to some embodiments.

FIG. 5 illustrates a screenshot of the measurement categories interface 500 wherein the measurements obtained by the tailor are stored with the type of garment the tailor wants to create for the client.

Figure 6:
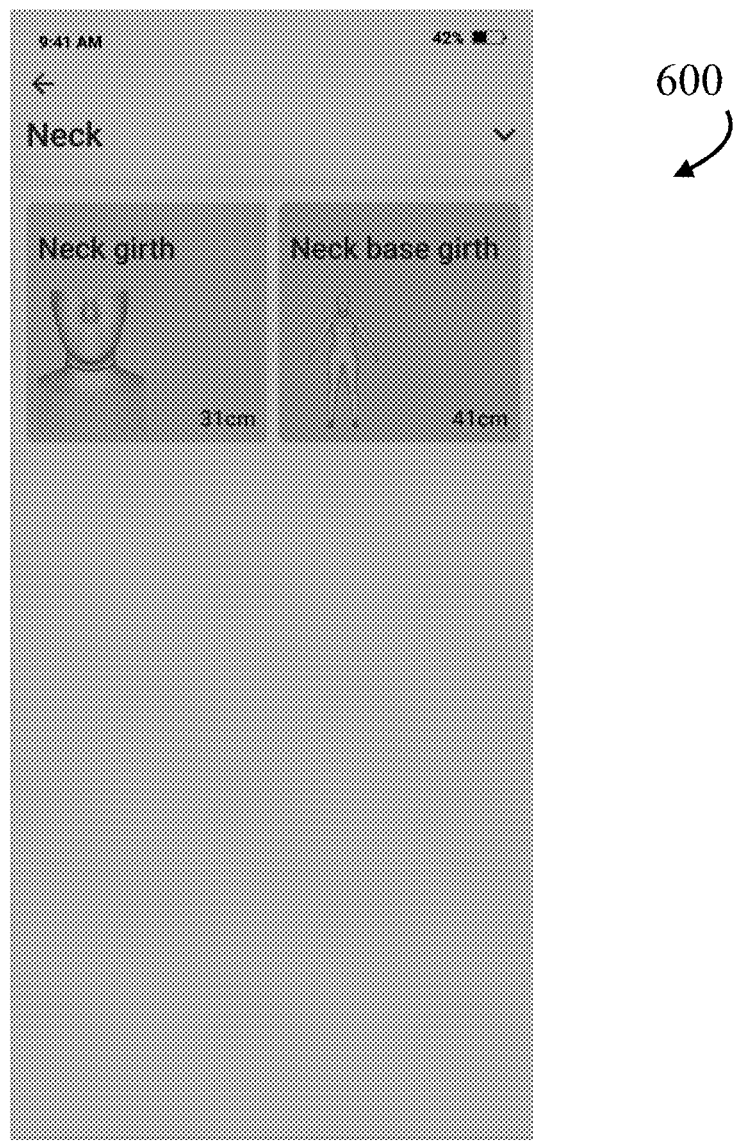
FIG. 6 illustrates a screenshot of the body measurements interface, according to some embodiments.

FIG. 6 illustrates a screenshot of the body measurements interface 600 wherein the measurements for a client are stored. For example, the tailor may measure the neck girth, neck base girth, shoulder width, arm length, chest girth, torso girth, inseam, etc. to obtain the measurements to create an appropriately sized garment for the client. One skilled in the arts will readily understand that various measurements may be made using the 3-dimensional model interface shown in FIG. 4.

In some embodiments, the system is in operable communication with an online marketplace. The marketplace allows the client to select garments they would like to purchase. The garments may be preselected based on the measurement of the client, or they may be tailored specifically to the client's measurements.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system for providing a virtual tailoring tool, the system comprising:
   at least one client device and at least one tailor device in operable connection with a user network;
   an application server in operable communication with the network, the application server configured to host an application system for providing a virtual tailoring tool, the application system having a user interface for providing access to the application system to the at least one client device and at least one tailor device, the user interface in operable communication with a measurement module to permit real-time measurements of a 3-dimensional model generated from imagery of a client.

2. The system of claim 1, wherein the measurement module permits a tailor to drag a finger over a region of the 3-dimensional model to manually obtain a real-time body measurements of the client by dragging from one point to the other using their fingertip on the mobile device or cursor on a desktop computer.

3. The system of claim 1, further comprising an online marketplace wherein the client shops for garments.

4. The system of claim 1, further comprising a client database to store a plurality of client measurements.

5. The system of claim 1, further comprising a marketplace to depict a virtual representation of the garment.

6. The system of claim 1, further comprising a measurement categories interface to permit the user to select one or more garment types, wherein a tailor manually enters measurements for the one or more garments.

7. The system of claim 1, further comprising a body measurements interface comprising a plurality of measurements associated with the client.

8. A system for providing a virtual tailoring tool, the system comprising:
at least one client device and at least one tailor device in operable connection with a user network;
an application server in operable communication with the network, the application server configured to host an application system for providing a virtual tailoring tool, the application system having a user interface for providing access to the application system to the at least one client device and at least one tailor device;
an image capture model to capture imagery of a client and to transmit the imagery to a measurement module in operable communication with the user interface, the measurement module to permit real-time measurements of a 3-dimensional model generated from imagery of a client, wherein the 3-dimensional model is generated by a modeling engine; and
a marketplace to depict a virtual representation of the garment.

9. The system of claim 8, further comprising a notifications module to transmit at least one notification to the client or the tailor.

10. The system of claim 9, wherein the measurement module permits a tailor to drag a finger over a region of the 3-dimensional model to manually obtain a real-time body measurements of the client by dragging from one point to the other using their fingertip on the mobile device or cursor on a desktop computer.

11. The system of claim 10, further comprising an online marketplace wherein the client shops for the garment.

12. The system of claim 11, wherein the garment includes at least one of the following: a button-down shirt, a blouse, a pant, and an evening gown, wherein a tailor stores measurements for the garment.

13. The system of claim 12, further comprising a client database to store a plurality of client measurements.

14. The system of claim 13, further comprising a marketplace to permit the user to select one or more garment types.

15. The system of claim 14, further comprising a body measurements interface comprising a plurality of measurements associated with the client.

16. The system of claim 15, further comprising a user module to permit a user to create a user account, wherein the user account stores, via the client database, the plurality of client measurements.

17. The system of claim 16, further comprising a display module to provide the display of the 3-dimensional model.

18. The system of claim 17, wherein the marketplace is in communication with a search engine to allow the user to search for the garment.

* * * * *